United States Patent
Esposito et al.

(10) Patent No.: US 7,005,409 B2
(45) Date of Patent: Feb. 28, 2006

(54) DISSOLVING GEL FOR CURED POLYSULFIDE RESINS

(75) Inventors: James R. Esposito, Parsippany, NJ (US); John C. Moore, Camarillo, CA (US)

(73) Assignee: General Chemical Performance Products, Parsippany, NJ (US)

( * ) Notice: Subject to any disclaimer, the term of this patent is extended or adjusted under 35 U.S.C. 154(b) by 175 days.

(21) Appl. No.: 10/790,664

(22) Filed: Mar. 1, 2004

(65) Prior Publication Data

US 2005/0192194 A1   Sep. 1, 2005

(51) Int. Cl.
  *C11D 7/26*   (2006.01)
  *C11D 7/32*   (2006.01)
  *C11D 7/50*   (2006.01)

(52) U.S. Cl. ............... 510/212; 510/175; 510/201; 510/245; 510/254; 510/499; 510/500; 510/501

(58) Field of Classification Search ............... None
  See application file for complete search history.

(56) References Cited

U.S. PATENT DOCUMENTS

| | | |
|---|---|---|
| 4,362,570 A | 12/1982 | Elwell |
| 4,505,881 A | 3/1985 | Diaz |
| 4,537,605 A | 8/1985 | Gouw |
| 4,624,837 A | 11/1986 | Baker |
| 4,693,873 A | 9/1987 | Baker |

*Primary Examiner*—Gregory R. Del Cotto
(74) *Attorney, Agent, or Firm*—Arthur J. Plantamura

(57) ABSTRACT

A cured resin dissolving composition comprising a cellulosic gelling agent prepared in n,n-dimethylacetamide, known for its high penetration and solvency to polar resins, with a glycol-ether co-solvent, 1,8-diazabicyclo(5.4.0)undec-7-ene as a soluble amine, and a surfactant. The mixture of components form a gel-form composition while maintaining high dissolution character for cured polysulfide resins. The optimum thickness of the gel form is dependent upon the amount of the cellulose gelling agent present in the mixture. The product may be used to remove coatings and sealants present on vertical and horizontal surfaces and hard to reach areas commonly encountered when performing maintenance on aviation fuel tanks and similar equipment. Once the system has been in contact with the resin and dissolution has been allowed for a period of time, the reacted material may be wiped away or can be easily rinsed with water, an alcohol, or another hydrophilic rinse. The invention has application in a wide range of industries where removal of cured resin is desired either in performing maintenance or for selective cleaning. Examples of industry applications include removing polysulfide coatings and sealants in aerospace, automotive, and construction.

7 Claims, No Drawings

DISSOLVING GEL FOR CURED POLYSULFIDE RESINS

This invention relates to a gel-form composition suitable for application on vertical and overhead surfaces that will effectively revert and dissolve cured polymeric compositions and in particular polysulfide substances contained on said surfaces.

BACKGROUND OF THE INVENTION

Polysulfide-based resins are used widely in the protection and sealing of components and hardware in many industries that include aviation. In fact, polysulfide-based resins are the primary products of choice for sealing fuel tank compartments. Within aviation, fuel tank sealants are highly regulated by the federal government to provide specific performance qualities. These formulations have been held constant over many decades and are used in many aircraft from small recreational to commercial airlines. The application and maintenance of these materials are also deemed to be regulated and expected to be held constant over many years.

When it becomes necessary to perform repair and maintenance on the polysulfide resin, it is most common to start with complete removal of the material from the area in question. Removal of the resin typically includes scraping and mechanical abrasion, resulting in significant damage to the underlying substrate. When substrate damage occurs, as is commonly the case, the surfaces must be reconditioned, requiring the use of several steps and significantly increasing the resources and cost of the original task. Attempts to use solvents render it impossible to control the cleaner to select areas or to vertical and overhead structures. When this fails, the operator typically defaults to the option of using mechanical action. Therefore, current practice in the maintenance and repair of polysulfide resin is labor-intensive and costly.

As a consequence of the needs for an effective and practical dissolution mechanism for polysulfide resin, the gel of the present invention was developed and found to be effective. The gel adheres well and allows the chemical formulation to be in direct contact with the cured polysulfide resin present on vertical and overhead surfaces. Reacted polysulfide may be easily wiped away to complete the task or when thick layers of material must be removed, additional gel-form of the chemistry may be added to repeat the process. Where necessary, a rinse may be used instead of wiping with a rag or napkin. Rinses include alcohol or water which causes the reacted polysulfide and gel to emulsify and disperse, allowing small orifices and cracks to be rinsed and left clean.

SUMMARY OF INVENTION

It has now been discovered, according to the invention, that a composition comprising a blend of chemistries and a viscosity modifier (gelling agent), which will revert, i.e. breakdown, and dissolve fully crosslinked (cured) polysulfide resins present on non-horizontal or open areas can be prepared. Such polymers include various sulfide containing polymers consisting primarily of crosslinked poly-dithioethylenes, -tetrathioethylenes, -thiobiphenylenes, -thiodifluoromethylenes, and -thiophenylenes and other related compounds containing the $[-C-S-C-]_n$ linkage. When the crosslinked polysulfide is exposed to the composition of the invention, the polymer will begin to breakdown, allowing the residue to be easily wiped or rinsed away. Applications and use of compositions of the invention include the removal of polysulfide encapsulation in electronics, sealants in aircraft, coatings and sealants in fuel tanks, and other uses involving situations where the elimination of insoluble crosslinked (cured) polysulfide polymer is desired. Due to the unique gel-form nature of the invention, opportunities exist to use it where controlled removal of a polysulfide resin from an open area where common solvents having low viscosity would travel to unwanted locations. Examples of controlled polysulfide resin removal from difficult and open areas include vertical and overhead surfaces. The gel-form of the invention may be applied by many means including pallet knife, paint-type roller, pump, sealant-type gun, or simply wipes and rubber gloves. Once applied, the removal rates to effect a thorough elimination, i.e. dissolution of any given cured polysulfide, will vary depending upon the formulation of the polysulfide, i.e., fillers contained, and amount, i.e., thickness present. Heat and agitation may be used to improve the removal process.

DETAILED DESCRIPTION OF THE INVENTION

In accordance with the invention we have discovered a solvent system to remove cured polysulfide coatings that is effective and facilitates the usage and adherence on vertical and overhead surfaces without significant dripping and thereby provides the retention time for solvating of the coatings. The invention is achievable with a composition of (a) dimethylacetamide (DMAC) between 70–90%, (b) tripropyleneglycol monomethylether (TPM) between 2–10%, (c) 1,8-diazabicyclo(5.4.0)undec-7-ene (DBU) between 2–10%, (d) hydroxypropylcellulose between 1–5%, and (e) a nonionic alkoxylated linear alcohol (surfactant) of between 0.5–1.0%.

We have found that the composition of this kind comprise a gel-like consistency that adheres well, without significant runoff, to vertical and overhead surfaces, and is effective in dissolving cured polysulfide resins thereby facilitating the easy removal of the coating with little or no additional treatment such as abrading or mechanical action.

This invention describes a novel chemistry in the form of a gel, which allows the removal of polysulfide-based resins from a variety of surfaces. The chemistry contains a polar solvent system and a strong amine having a pKa value of near 12. When a cellulosic-based polymerization additive is used in the preparation of the mixture, the result is a gel form of the final product that is stable over long periods of time. This gel-form solvent system allows its application to vertical and overhead surfaces with a high selectivity. Once the solvent system is brought into contact with the polysulfide resin, the amine component extracts the sulfide and breaks down the resin where it may be easily wiped away from the surface, leaving the underlying substrate unharmed. In situations where wiping with a rag or napkin is not possible or impractical, rinsing with alcohol or water may be performed. The rinse mixes with the gel and reacted polysulfide to emulsify and disperse it from the substrate, leaving small cracks and hard to reach crevices free of residue.

The invention has ability in dissolving cured polysulfide resinous coating and is particularly advantageous in the removal of vertical and overhead surfaces, which when using liquid compositions (i.e., non-gel form) have the tendency to drip. The invention has proved to be effective due to its ability to adhere to such surfaces without significant dripping and to fully dissolve the crosslinked cured polysulfide resin layer. An abrading or grinding action, which often results in damage to the surface, is not needed.

The primary object of the present invention is to provide a gel or gelling capable chemistry that is particularly adapted for dissolving and removing cured polysulfide formulations from a variety of substrates. The gel-form of the invention is found to wet the surface while firmly adhering, particularly to vertical and overhead areas such that minimal or no dripping occurs. By minimizing the messy nature of using solvents in hard to reach areas where sensitive devices (e.g., wires, linkages, circuitry, etc.) may exist, the material may be more easily controlled. The gel-form of the cleaner will minimize exposure to the operator as well as minimize usage.

The base formulation is designed for maximum performance on dissolving and removing cured polysulfide resins. The system must be free of water (e.g., anhydrous) in order for it to penetrate and swell the cured resin. The preferred solvent, dimethylacetamide (DMAC) is designed for effective action and solubility on the resin, while the amine, 1,8-diazabicyclo(5.4.0)undec-7-ene (DBU), is present to leach-out the sulfide chemistry and react to effect complete dissolution. A high molecular weight co-solvent, tripropyleneglycol monomethylether (TPM) is present to enhance gelling capacity and to effect dispersion of the sulfide reactants during removal.

Suitable surfactants include non-ionic alkoxylated linear alcohols such as the tradename Plurafac SL92, available from BASF Corporation. The surfactant functions to reduce surface tension and aid in the rinsing process. The surfactant preferably has a high cloud point (i.e., >60° C.) to allow for heated processing and rinsing without miscibility issues. A non-ionic environment is required for inert conditions towards dissolved metals and maximum solubility in a wide range of media, both solvent and water. Low foaming capacity allows for product use in various automated equipment. Alternative surfactants include nonyl-phenols and nonyl-ethoxylates with a HLB (hydrophilic/lipophilic balance) ranging from 7–15. Less than about 2 weight percent of the non-ionic surfactant and preferable an amount of about 0.5 to about 1 weight percent is sufficient.

GENERAL PROCEDURE

In preparing the stripping composition of the invention, a preferred order of addition is employed. As stated earlier, the invention includes a viscosity modifier (gelling agent) which has been shown to be concentration dependent in performance, prone to agglomerate without proper mixing, and also to be sensitive with certain organic materials, namely, amines or similar organic alkalis. Therefore, it is important to add the majority of constituents and begin mixing, saving the gelling agent and DBU amine for last. For proper dispersion and reaction of the gel, it is generally preferable to add the gelling agent to the mixture during the mixing process, allow a given period of time for the gelling agent to disperse or wet-out in the given chemistry, and then add the DBU amine ingredient last. Therefore, all of the solvents and the surfactant are measured in the desired proportion and introduced into a suitable mixing vessel and thoroughly mixed by stirring.

The stirring mechanism is most preferred to be a rotary device with spinning paddle or impeller. The design of the impeller should be consistent with the general equipment that is commonly used for high speed dispersion, however, this mixing process does not require mixing speeds to >1500 rpm. Examples of impeller designs include diameters that are approximately ⅓ of that diameter of the mixing vessel, normally a round-type or cylindrical tank. Further, when mixing, the impeller should be approximately ⅓ of the distance from the tank vessel bottom as compared with that same distance to the liquid level. Information on these mixing practices may be sought in a variety of texts which discuss fundamentals of high speed dispersion.

Once the mixing vessel equipment is set-up and the solvents and surfactant are mixing, the gelling agent may be added. The gelling agent (hydroxypropylcellulose) is normally available in plastic lined paper bags as a fine powder. It is added slowly by sprinkling the desired amount into the chemistry while the mixing operation is underway. The gelling agent is allowed to mix into the chemistry for at least 15 min. and up to about to 30 min. During this period, the mixture will become noticeably thicker, revealing a higher product viscosity. Although a higher viscosity is noted, the product still flows and pours. To allow for continued proper dispersion and mixing, the mixing speed may need to be adjusted upwards. After the initial period of 15–30 min. is completed for wetting of the gelling agent, the DBU amine may be added. The amine is added to the contents in the same fashion as that for the gelling agent, namely, while mixing is underway. When the amine DBU is added, a significant increase in viscosity is anticipated. The operator should be prepared for this change and shall increase the impeller speed as necessary to effect proper mixing of the contents. As the gelling reaction continues, the product will increase in viscosity to the point where it becomes a gel. Mixing may be continued for another 15–30 min., or until the operator is comfortable with the homogeneity of the final product. At this point, the mixing process may be shut down and the viscosity measurement begins.

Viscosity measurement is conducted with a rotational, spindle-type equipment that measures the torque required to rotate an immersed tool of defined shape inside the given medium. An example for such equipment is the Digital Viscometer, Model DV-I+ with a variety of spindle shapes and sizes, as manufactured by Brookfield Engineering Laboratories, Inc. The instrument is able to measure fluid viscosities at >50,000 centipoise (cps). Using this type of equipment and spindles #4 and #6, measurements between 11,000–130,000 cps were recorded.

Measurements should be taken during the early stages of mixing the invention and also be checked after a period of 3 days have elapsed. By comparing these values, a minimal allowable increase in viscosity may be experienced. However, a decrease, suggesting a material deterioration, is undesirable. Based upon testing formulations of the invention, the target viscosity values should be 25,000+/−10,000 cps at preparation time (i.e., within 3 hrs. of mixing), and 50,000+/−20,000 cps as measured after 3 days. A further description of this target range is given in Table 1.

TABLE 1

Viscosity target for the invention using 1–5% w/w of gelling agent.

| Medium | Viscosity, Min | Viscosity, Target | Viscosity, Max |
|---|---|---|---|
| 1–5% gelling Agent, <3 hrs. | 15,000 | 25,000 | 35,000 |
| 1–5% gelling Agent, 72 hrs. | 30,000 | 50,000 | 70,000 |

In working with formulations of the invention, if viscosities of the final product falls within the values noted at 72 hrs. (i.e., 30,000–70,000 cps), the product is useful for maintaining its consistency for non-horizontal surfaces and is able to wet the surface to a minimum level necessary to carry-out the dissolution process.

Although the invention has been described in terms of particular embodiments, blends of one or more of the various additives described herein can be used, and substitutes therefor, as will be know to those skilled in the art. Thus, the invention is not meant to be limited to the details described herein, but only by the scope of the appended claims.

What is claimed:

1. A composition effective for dissolving a cured polysulfide resin from vertical and overhead surfaces comprising:
   (a) n,n-dimethylacetamide;
   (b) a co-solvent that is compatible with the n,n-dimethylacetamide, exhibits dispersion capacity, and contains a minimum amount of alcoholic character needed for enhancing the action of the gelling agent;
   (c) 1,8-diazabicyclo(5.4.0)unde-7-ene; and
   (d) a gelling agent.

2. The composition of claim 1 which further comprising a compatible surfactant.

3. The composition of claim 1 wherein component (b) is tripropyleneglycol monomethylether (TPM).

4. The composition of claim 1 wherein component (d) is hydroxypropylcellulose.

5. The composition of claim 4 wherein the viscosity of the final product is controlled to 25,000+/−10,000 cps and 50,000+/−20,000 cps, tested at <3 hrs. of preparation and at approximately 72 hrs., respectively.

6. A process for removing cured polymer resin from the surface of vertical or horizontal substrates containing a layer of cured resin with the composition of claims 1 or 4, allowing sufficient lapse of time to permit the dissolution of the resin and removing the dissolved resin from the substrate by wiping or with a rinse.

7. The process of claim 6 wherein the cured resin to be removed from the substrate is a cured polysulfide.

\* \* \* \* \*